(12) United States Patent
Mirza

(10) Patent No.: US 7,244,283 B2
(45) Date of Patent: Jul. 17, 2007

(54) FILTER ASSEMBLY

(75) Inventor: Daryl Mirza, Pleasant Prairie, WI (US)

(73) Assignee: Facilitec USA, Incorporated, Pleasant Prairie, WI (US)

( * ) Notice: Subject to any disclaimer, the term of this patent is extended or adjusted under 35 U.S.C. 154(b) by 324 days.

(21) Appl. No.: 10/897,665

(22) Filed: Jul. 22, 2004

(65) Prior Publication Data

US 2006/0016339 A1    Jan. 26, 2006

(51) Int. Cl.
*B01D 46/00* (2006.01)
*F23L 17/14* (2006.01)

(52) U.S. Cl. .................. 55/486; 55/494; 126/299 R

(58) Field of Classification Search ............ 454/41, 454/365; 126/299 R, 299 D, 299 E, 300, 126/301; 55/518, 486, 490, 494, DIG. 36; 96/108, 134, 154
See application file for complete search history.

(56) References Cited

U.S. PATENT DOCUMENTS

| 143,339 | A | | 9/1873 | Frazer |
|---|---|---|---|---|
| 1,090,026 | A | | 3/1914 | Chillis |
| 2,847,085 | A | | 8/1958 | Ehlers |
| 3,566,585 | A | | 3/1971 | Voloshen et al. |
| 3,660,969 | A | | 5/1972 | Fox |
| 3,695,164 | A | | 10/1972 | Stalker |
| 3,760,566 | A | | 9/1973 | Zievers et al. |
| 4,323,373 | A | | 4/1982 | Fritz |
| 4,325,290 | A | | 4/1982 | Wolfert |
| 4,350,504 | A | | 9/1982 | Diachuk |
| 4,450,756 | A | | 5/1984 | Kling |
| 4,506,655 | A | * | 3/1985 | Kuechler ............ 126/299 D |
| 4,610,705 | A | | 9/1986 | Sarnosky et al. |
| 4,635,617 | A | | 1/1987 | Simonsen |
| 4,673,423 | A | | 6/1987 | Yumlu |
| 4,869,236 | A | | 9/1989 | Blough |
| 4,887,588 | A | | 12/1989 | Rial |
| 4,923,725 | A | | 5/1990 | Zafiroglu |
| 5,078,047 | A | | 1/1992 | Wimberly |
| 5,196,040 | A | | 3/1993 | Malloy et al. |
| 5,318,607 | A | | 6/1994 | Malloy et al. |
| 5,512,073 | A | | 4/1996 | Mirza et al. |
| 5,540,744 | A | | 7/1996 | Renna |
| 5,567,216 | A | | 10/1996 | Mirza et al. |
| 5,874,292 | A | * | 2/1999 | McMinn, Jr. ............ 435/262 |
| 6,143,047 | A | | 11/2000 | Jodoin et al. |

(Continued)

OTHER PUBLICATIONS

Grainger Industrial and Commercial Equipment and Supplies, Fall 1993 General Catalog No. 384, pp. 2707, 2708, 2710.

(Continued)

*Primary Examiner*—Frank M. Lawrence
(74) *Attorney, Agent, or Firm*—Fitch, Even, Tabin & Flannery

(57) ABSTRACT

A grease filter assembly is provided for absorbing airborne grease discharged from a grease discharge vent extending from a roof. A support is mountable to the duct of the grease discharge vent and grease absorbing pads are supportable upon the support frame in stationary position surrounding the discharge vent and in spaced relation from the roof. A fireproof barrier is disposed between the grease absorbing pads and the roof. Additionally, one or more hinges may be provided to allow the grease discharge vent to be easily opened for cleaning and maintenance.

22 Claims, 10 Drawing Sheets

U.S. PATENT DOCUMENTS 6,391,074 B1 * 5/2002 McCrary .................... 55/321
6,468,323 B1 * 10/2002 Chwala ....................... 55/490
6,716,099 B2 4/2004 Pfleiderer et al.

OTHER PUBLICATIONS

Undated brochure entitled "Cook's 'Grease Terminator'", Loren Cook Company.

Unnumbered and undated page from Grease Guard, Inc. brochure, entitled "Don't Let Grease Damage Soak Up Your Profits!".

Unnumbered and undated page from Grease Guard, Inc. brochure captioned "Grease Guard.TM. Meets the 'Competition'".

Unnumbered and undated page captioned "Accessories & Options".

Unnumbered and undated page captioned "Direct and Belt Drive Upblast Centrifugal Roof Exhausters Models CUE and CUBE".

* cited by examiner

FILTER ASSEMBLY

FIELD OF THE INVENTION

The present invention relates generally to filter assemblies and, more particularly, to filter assemblies for collecting airborne viscous substances discharged from vents.

BACKGROUND

Many facilities, such as restaurants, have production processes which require the discharge of significant volumes of grease through roof-mounted discharge vents. The discharged grease may accumulate on the roof and cause deterioration of the roofing materials surrounding the grease discharge vent, including the flashing and gaskets associated with the vent installation. These roofing materials are typically organic materials which may deteriorate rapidly when exposed to grease. Certain grease filter assemblies are successful in absorbing or trapping the grease discharged from roof-mounted discharge vents.

Examples of such successful grease filter assemblies are disclosed in U.S. Pat. Nos. 5,512,073 and 5,567,216, issued to one of the same inventors as the present invention. These prior grease filter assemblies advantageously provided grease absorbing materials near the discharge vents using a support frame clamped to the duct in a manner that did not compromise the integrity of the duct, a requirement of many municipalities or governing bodies. By attaching to the duct, as opposed to the roof, the grease filter assembly is placed as close to the grease discharge vent as necessary to adequately absorb, trap, and filter the grease discharged from the vent. This prior grease filter assembly employs a universal frame structure for attachment and support so that it does not depend on a particular roof design or roof-duct configuration. This prior grease filter assembly also uses composite grease absorbing pads that are supported around the duct. This eliminates the need to cut the pad specifically to fit the duct.

There is now a desire to further address fire prevention measures for grease discharge assemblies. More specifically, the National Fire Protection Association publishes standards entitled "Standard for Ventilation Control and Fire Protection of Commercial Cooking Operations," which are also referred to as "NFPA 96." NFPA 96 includes fire prevention standards for roof-mounted grease discharge vents. One of these standards requires a fire resistant barrier between the roof and any grease collecting device. Another standard requires that grease discharge vents be accessible and operable for cleaning. Therefore, there is a need for a grease filter assembly that further addresses additional fire preventative measures and standards.

DETAILED DESCRIPTION OF THE PREFERRED EMBODIMENT(S)

Figure 1A:
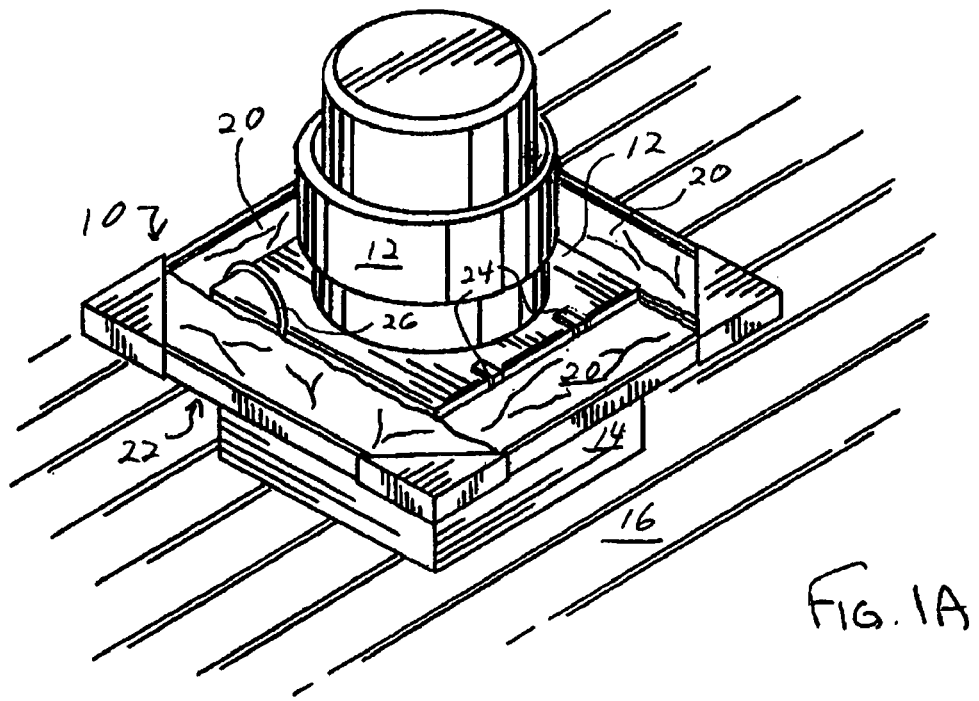
FIG. 1A is a perspective view of a grease filter assembly embodying features of the present invention.

With reference to FIGS. 1A–4, there is illustrated a grease filter assembly 10 for absorbing grease from a grease discharge vent 12 mounted on a duct 14 extending upward from a roof 16. The grease filter assembly 10 includes a support frame 18 clamped about the duct 14 above the roof 16 and generally near the grease discharge vent 12. The support frame 18 supports grease absorbing pads 20. The grease filter assembly 10 also includes a fireproof barrier 22 made from a plurality of panels 50 and 52 at the support frame 18. The barrier 22 is disposed between the grease absorbing pads 20 and the roof 16. The preferred fireproof barrier satisfies the requirements of NFPA 96.

Further, the grease filter assembly 10 includes top corner covers 66 to retain the grease absorbing pads 20 in a position on the support frame 18 to collect grease discharged from the vent 12. The grease filter assembly 10 also may include a pair of hinges 24 and a hinge stop 26 which combine to allow the vent 12 to be easily opened a predetermined amount for maintenance, such as proper cleaning.

Figure 2:
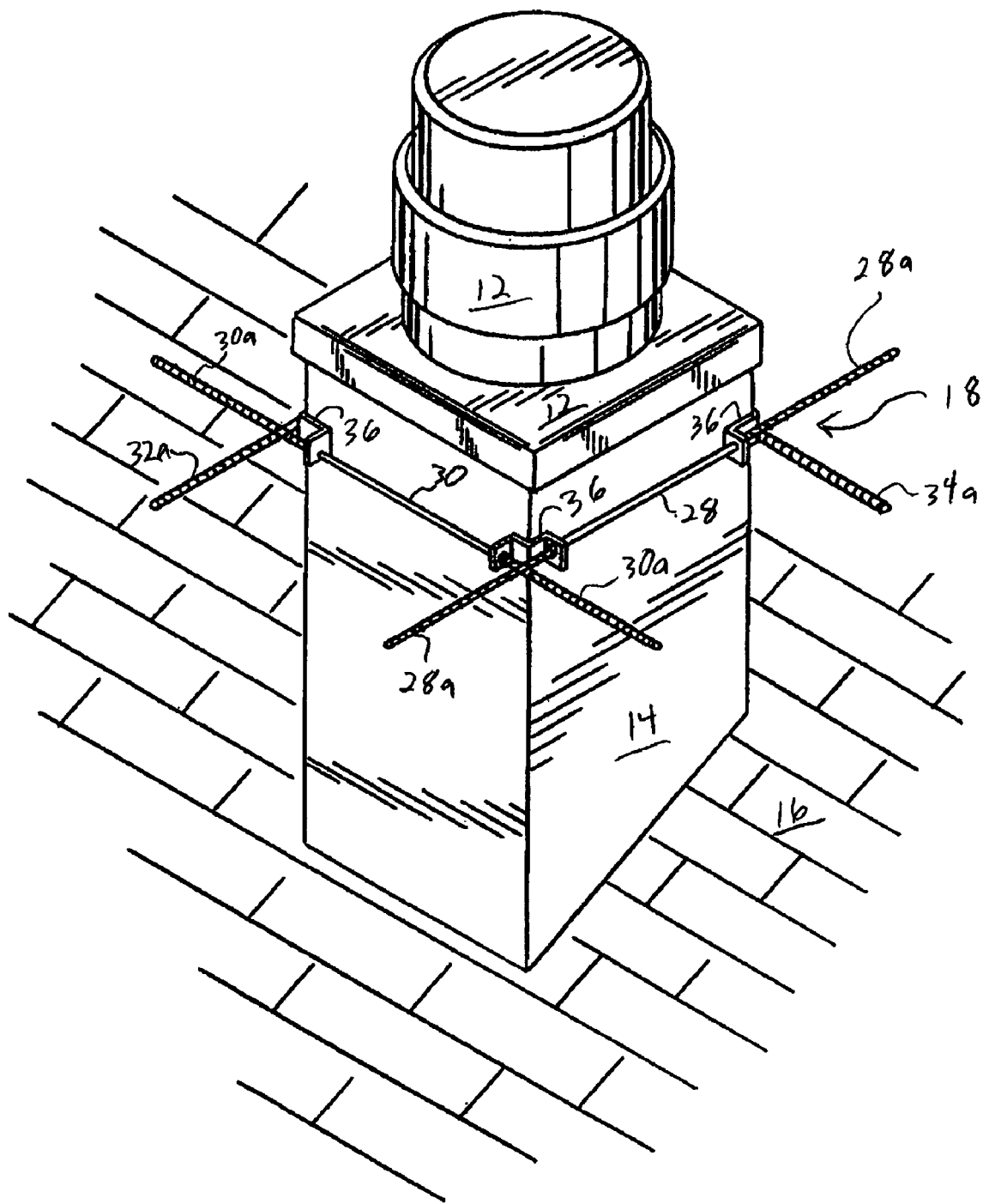
FIG. 2 is a perspective view of a support frame of the grease assembly of FIG. 1A.
Figure 3:
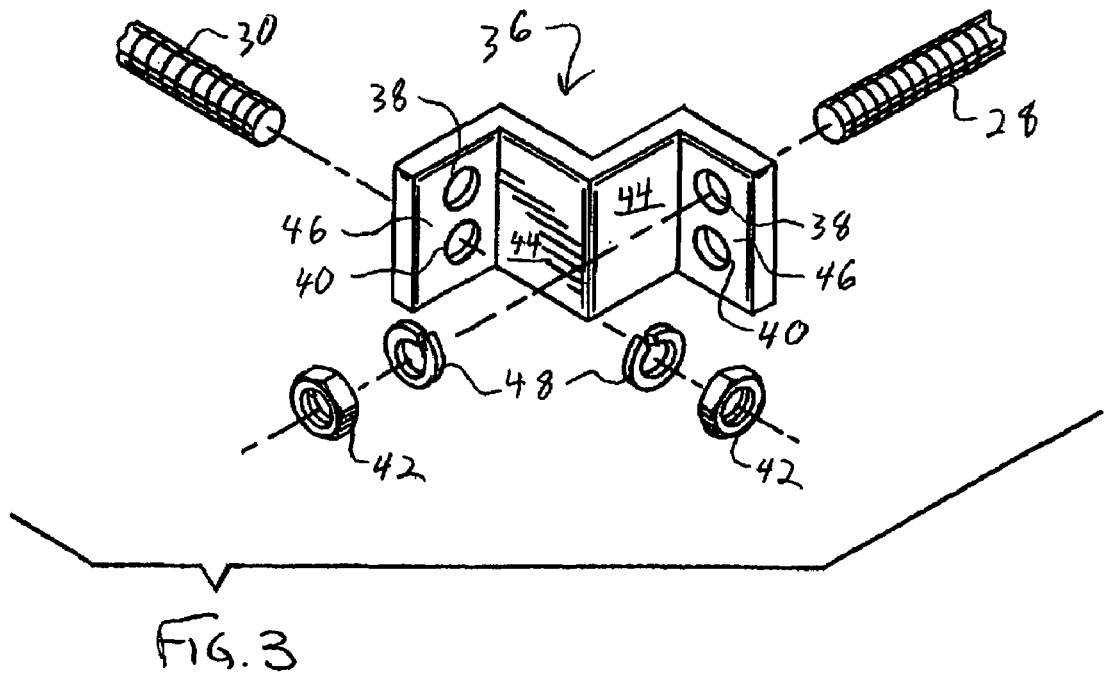
FIG. 3 is an enlarged exploded perspective view of a mounting bracket of the support frame of FIG. 2.

Referring to FIGS. 2 and 3, the support frame 18 preferably includes a plurality of elongated support members 28, 30, 32, and 34, which are designed to extend generally horizontally along adjacent sides of the duct 14. The support members 28, 30, 32, and 34 are greater in length than the respective sides of the duct 14 to provide end extensions 28a, 30a, 32a, and 34a to support the fireproof barrier 22 and the grease absorbing pads 20. The preferred support members are rods with the end extensions being threaded. Alternatively, the entire rod could be threaded. Moreover, the support members could have other cross-sections, such as square, rectangular, etc. Each of the support members is made of a non-flammable material, such as metal.

The support frame 18 includes a plurality of mounting brackets 36 preferably designed to complement corners of the duct 14. Each bracket 36 includes four planar segments 44, 46. The inner planar segments 44 are disposed at an angle, preferably a right angle, to one another to complement and receive a corner of the duct 14. The outer planar segments 46 also are each disposed at an angle, preferably a right angle, to one of the inner segments 44 such that they extend away from the duct 14, preferably perpendicularly. Each of the planar segments 44 and 46 preferably is rectangular in shape and made of a non-flammable material, such as metal.

Each of the outer planar segments 46 defines a pair of apertures 38 and 40 sized to receive the end extensions 28a, 30a, 32a, and 34a of the elongated support members 28, 30, 32, and 34. The pair of apertures 38 and 40 preferably are spaced from one another and aligned along the horizontal axis of the respective outer planar segment 46. As discussed further below, in mounting the support frame 18 to a duct 14, alternate holes are used at each bracket 36. For example, as illustrated in FIG. 3, support member 28 is to extend through aperture 38, and support member 30 is to extend through aperture 40. Thus, although not required, the inclusion of a pair of apertures at each outer planar segment makes each bracket 36 universal because it can be turned over and still be installed, and the apertures would be reversed at each support member.

The support frame 18 also includes a plurality of fasteners 42 to secure the brackets 36 together with the support members 28, 30, 32, and 34 and clamp the support frame 18 to the duct 14. The fasteners 42 should be tightened such that the support frame 18 remains at the desired vertical position on the duct 14.

Although a number of suitable alternative fasteners known in the art may be used, a nut 42 is the preferred fastener. A nut 42 is threaded on each of the preferred threaded end extensions 28a, 30a, 32a, and 34a of the support members 28, 30, 32, and 34. Each nut 42 is tightened against its respective bracket 36 a similar amount so that the same amount of the end extension extends from each bracket 36 for each support member 28, 30, 32, and 34 and so that the frame structure 18 cannot unintentionally move along the duct 14. However, the nuts 42 should not be over tightened so as to damage the duct 14 A locking washer 48 also may be disposed between each nut 42 and its respective bracket 36 on each end extension 28a, 30a, 32a, and 34a to aid in preventing unintentional loosening of the nut 42.

To install grease filter assembly 10, the four mounting brackets 36 first are placed at the four corners of the duct 14. Then the support members 28, 30, 32, and 34 are passed through the member-receiving apertures 38 and 40 in the mounting brackets. As mentioned above, vertically spaced apertures 38 and 40 allow adjacent supporting members, such as members 28 and 30, to cross one another without interference at their respective end extensions, such as end extensions 28a and 30a. More specifically, for example, the supporting member 28 on a first side of the duct 14 will pass through the upper apertures 38 of the mounting brackets 36 at two corners of the duct 14. The two adjacent supporting members 30 and 34 on the two adjacent sides of the duct 14 will extend perpendicular to the first side of the duct 14 and will pass through the lower apertures 40 of the mounting brackets 36. Next, the locking washers 48 are placed on the end extensions 28a, 30a, 32a, and 34a of the supporting members 28, 30, 32, and 34, and the nuts 42 are threaded on to the end extensions 28a, 30a, 32a, and 34a. The nuts 42 are tightened against the mounting brackets 36 until the mounting brackets 36 nearly engage the duct 14. At this point, the support frame 18 is moved to its desired vertical position on the duct 14, and then, the nuts 42 are tightened to their desired torque, which draws the mounting brackets 36 toward each other and toward the duct 14 to securely clamp the supporting members 28, 30, 32, and 34 and mounting brackets 36 to the duct 14. The support frame 18 allows for easy placement anywhere along the length of the duct 14 without compromising the integrity of the duct 14. It also allows for effective use with a wide variety of duct 14 sizes and configurations.

Figure 1B:
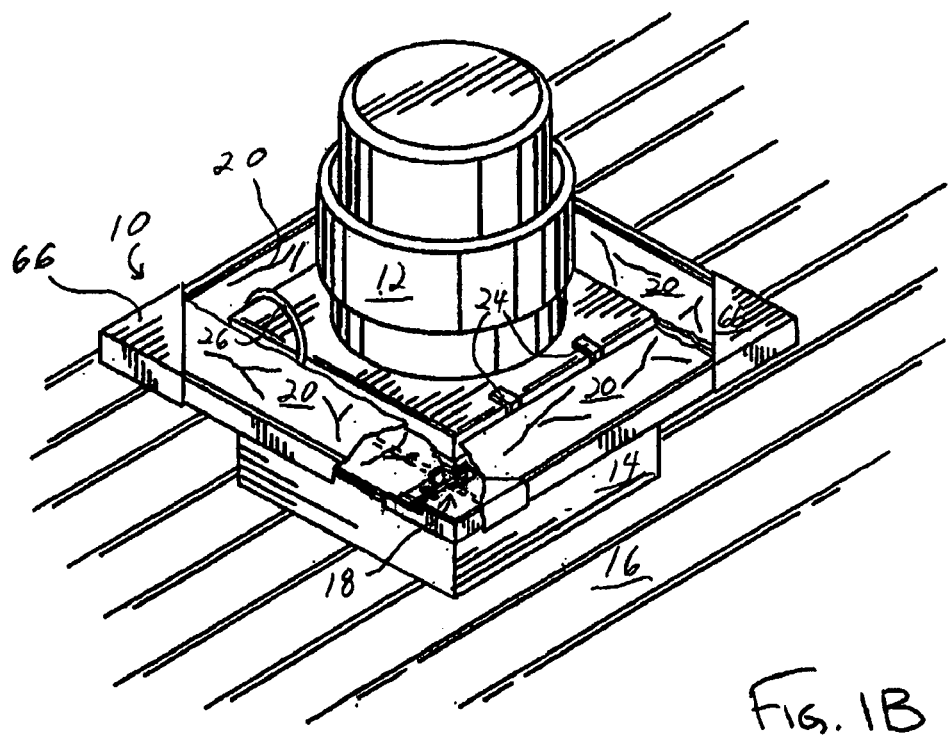
FIG. 1B is a partially cut-away perspective view of the grease filter assembly of FIG. 1A.
Figure 4:
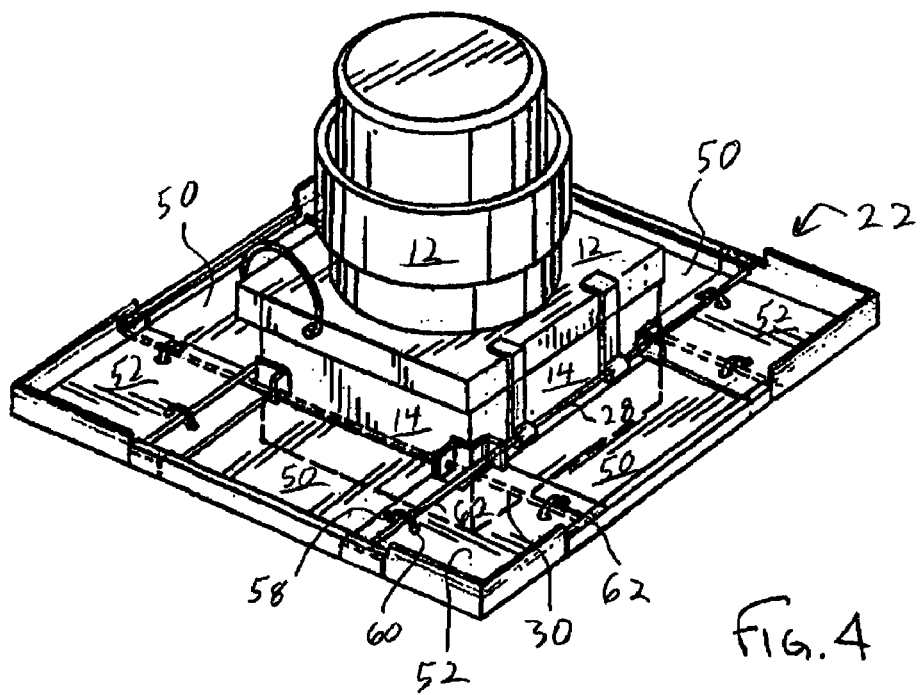
FIG. 4 is a perspective view of the grease filter assembly of FIG. 1A with the grease absorbing pads and top corner covers removed.

Once the support frame 18 is installed, the fireproof barrier 22 and grease absorbing pads 20 can be installed. More specifically, as illustrated in FIGS. 1A, 1B, and 4 the fireproof barrier 22 is made from a fireproof material and is attached to the support frame 18. The preferred barrier 22, with reference to FIG. 4, includes two bottom side barrier panels 50 and four bottom corner barrier panels 52 attached to the support frame 18. The grease absorbing pads 20 are placed on the supporting frame 18 above the fireproof barrier 22 formed by the side and corner panels 50 and 52, and thus the fireproof barrier 22 is disposed between the grease absorbing pads 20 and the roof 16.

Figure 5:
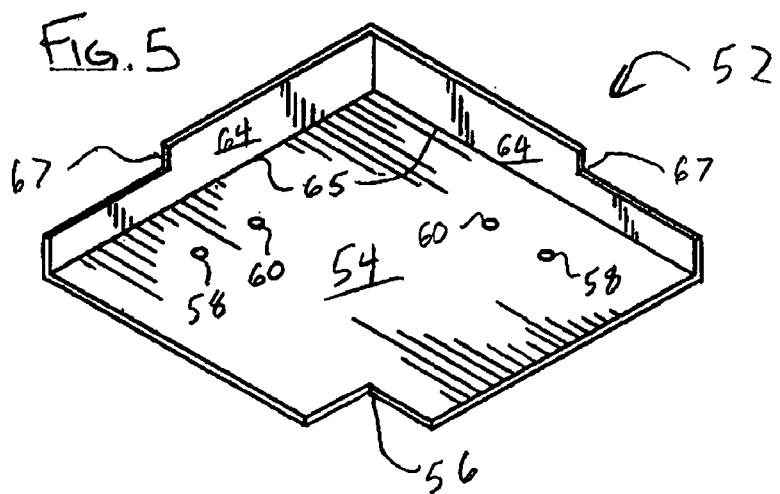
FIG. 5 is a perspective view of a bottom corner barrier panel from the grease filter assembly of FIG. 1A.

As illustrated in FIG. 5, the preferred corner panels 52 of the fireproof barrier 22 each include a generally square main portion 54 with two up-standing flanges 64 at two of the adjacent edges 65. The main portion 54 is sized to extend under the entire portion of the absorbing pad 20 at the corner area of the supporting frame 18 about the duct 14. Fit tightly against the duct 14, each main portion 54 includes a notch 56 generally shaped to receive the inner segments 44 of the corresponding bracket 36 at the corner of the duct 14. More specifically, each notch 56 is located at the corner of the main portion 54 opposite the corner with the adjacent flanges 64. Each corner panel 52 also defines two pairs of fastener-receiving apertures 58 and 60 such for receiving a fastener 62 to attach the corner panel 52 to the support frame 18.

As mentioned above, each flange 64 extends upward from the generally flat main portion 54 of the corner panel 52 along the adjacent edges 65. Each flange 64 is substantially parallel to the respective side of the duct 14 such that the flanges 64 restrict lateral movement of the associated grease absorbing pad 20. More specifically, outer sides of the grease absorbing pad 20 are held in place by the flanges 64 of the corner panels 54, and the inner sides engage the duct 14.

The flanges 64 of the preferred corner panels 54 each define a rectangular notch 67 to accommodate portions of the side panels 50 that overlap the corner panels 52. The overlapping is preferred to enhance the overall fire protection of the fireproof barrier 22 between the grease absorbing pads 20 and the roof 16. The preferred corner panel 54 consists of an integral body of fireproof material, such as a hard plastic or metal.

Figure 7:
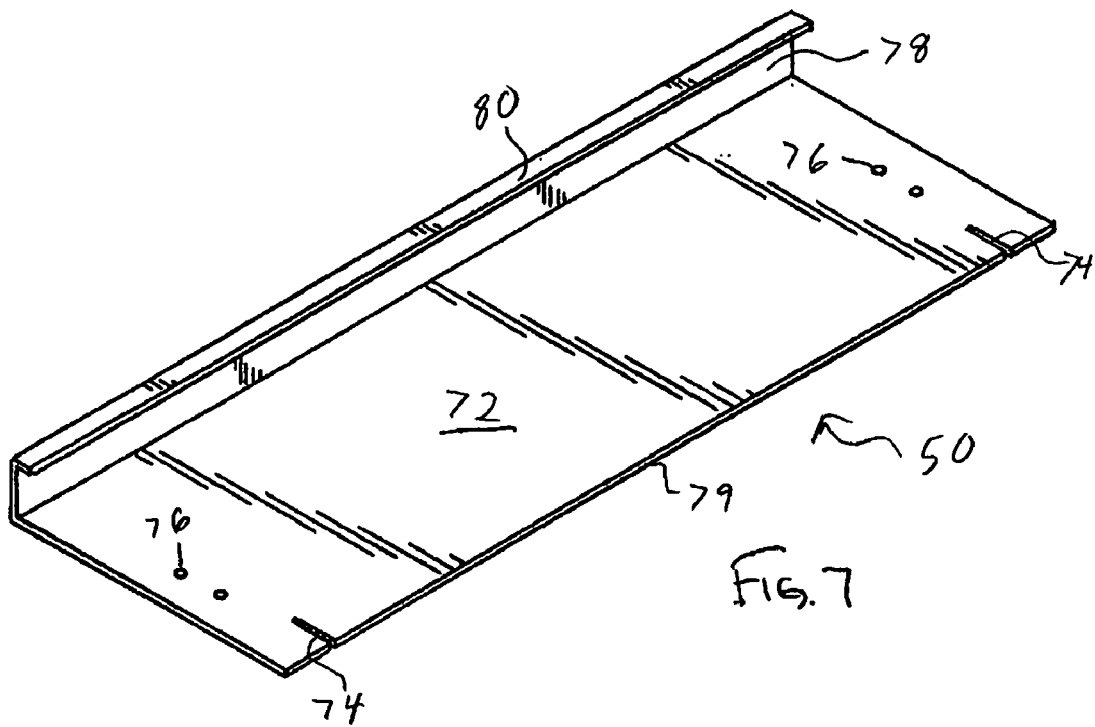
FIG. 7 is a perspective view of a bottom side barrier panel from the grease filter assembly of FIG. 1A.
Figure 8:
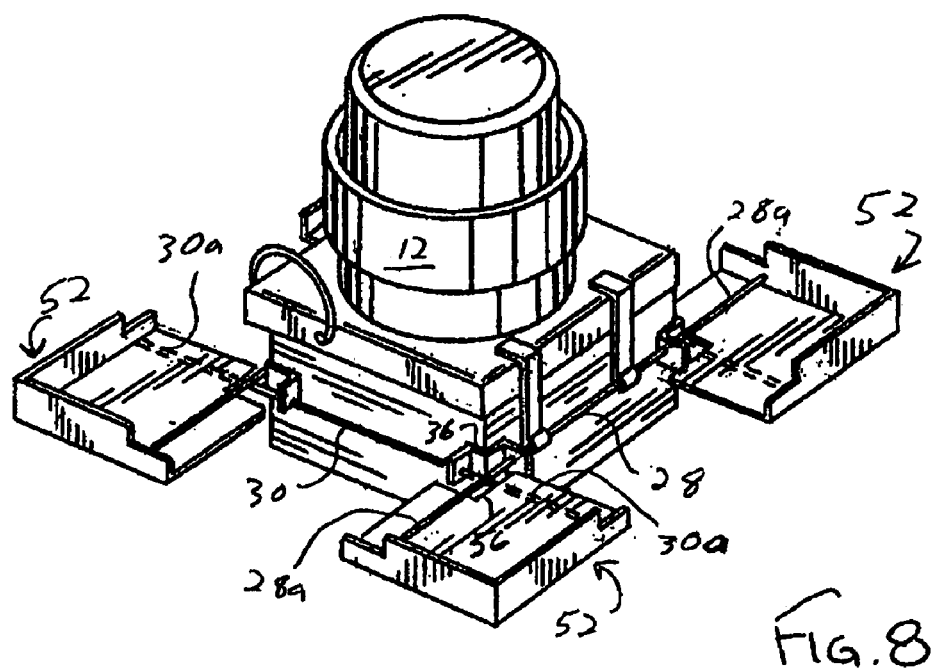
FIG. 8 is a perspective view of the support frame and bottom corner barrier panels of the grease filter assembly of FIG. 1A.

With reference to FIG. 7, each of the preferred side panels 50 has a rectangular, generally flat main portion 72 and a flange 78 extending upward from one of the longitudinal edges of the main portion 72. The main portion 72 defines two slits 74. Each slit 74 is configured to receive one of the outer segments 46 of the mounting brackets 36 so that the longitudinal edge 79 opposite the flange 78 of the side panel 50 may be positioned substantially against the side of the duct 14. The main portion 72 of the side panel 50 also defines two apertures 76 for receiving a fastener 62 to attach the side panel 50 to the support frame 18.

As mentioned above, each side panel 50 includes the flange 78, which extends upward from the main portion 72 of the side panel 50 along one of the longitudinal edges. The flange 78 engages the grease absorbing pad 20 to restrict lateral movement of the grease absorbing pad 20. More specifically, the outer side of the grease absorbing pad 20 is engaged by the flange 78, and the inner edge of the grease absorbing pad 20 is engaged by the duct 14. The preferred flange 78 also includes a lip 80 extending toward the duct 14 and generally parallel to the main portion 72. A portion of the grease absorbing pad 20 rests between the lip 80 and main portion 72 such that the lip 80 further restricts the movement of the grease absorbing pad 20 relative to the support frame 18. In the preferred side panel 50, the main portion 72, the flange 78, and the lip 80 are integral with one another and made from a fireproof material such as a hard plastic or metal.

As illustrated in FIGS. 1A and 1B the preferred grease filter assembly 10 includes four top corner covers 66. The grease absorbing pads 20 extend further than the length of the duct 14 such that the pads 20 overlap at each of the four corners around the duct 14. For the rectangular shaped duct 14 as shown, there are preferably four absorbing pads 20. More specifically, a pair of pads 20 is preferably placed on the support frame 18 on opposite sides of the duct 14. Then, a second pair of pads 20 is placed on the support frame 18 at the two remaining sides of the duct 14, thereby overlapping the ends of the first pair of pads 20. Thus, the top cover 66, when attached to the corner panel 52, secures the grease absorbing pads 20 between the top cover 66 and corner panel 52, thereby restricting their movement.

Figure 6:
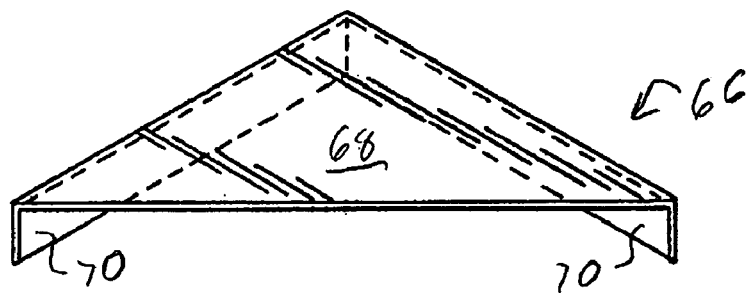
FIG. 6 is a perspective view of a top corner cover from the grease filter assembly of FIG. 1A.

As illustrated in FIG. 6, each corner top cover 66 preferably includes a triangular main portion 68 with a pair of flanges 70, each extending in a perpendicular direction from one of two adjacent sides of the triangular main portion 66. Each triangular main portion 68 is shaped and sized to fit over the grease absorbing pads 20 with the flanges 70 overlapping the flanges 64 of the corner panel 52. Each top cover 66 is identical and preferably made from a fireproof material, such as hard plastic or metal. Each top cover 66 is affixed to the respective corner panel 52 using a semi-permanent adhesive between their respective flanges 64 and 70, allowing for easy removal when performing regular maintenance of the grease discharge vent 12 and replacing the grease absorbing pads 20. Although a semi-permanent adhesive is preferred, several other suitable methods exist to attach the top cover 66 to the corner panel 52 including Velcro, screws, etc.

The side panel 50, the corner panel 52, and the top cover 66 combine to provide both the fireproof barrier 22 and a retainer for the grease absorbing pads 20 to retain them in the proper position to collect grease from the grease discharge vent 12. As mentioned, the flanges 64 and 78 of the panels 50 and 52 restrict lateral movement of the grease absorbing pads 20. The top cover 66 and the lip 80 of the side panel 50 restrict vertical movement of the grease absorbing pads 20.

Once the support frame 18 is clamped to the duct 14, the side and corner panels 50 and 52 are attached to the support member end extensions 28a, 30a, 32a, and 34a. The offset between the support members 28, 30, 32, and 34 also creates a space in which each of the corner panels 52 may be inserted with the notch 56 up against the mounting bracket 36. The apertures 58 and 60 are positioned on each of the corner panels 52 such that the two support members crossing at the corner, such as supporting members 28 and 30, pass over and under the respective corner panels 52. The support members also pass between the pair of apertures 58 and 60 allowing for the fasteners 62 to fasten the corner panel 52 to the pair of supporting members (e.g., supporting members 28 and 30). The fasteners 62 preferably are not added until the side panels 50 also are in place, as explained below.

The side panels 50 are measured against the location of the mounting brackets 36, and, more particularly, the two outer segments 46 of the mounting brackets 36 on the same side of the duct 14, to determine where the slits 74 need to be made to receive the two outer segments 46. Once the two slits 74 are cut in each of the four side panels 50, the panels 50 are slid into place such that they are placed underneath the corner panels 52 where the two adjacent panels overlap. When in place, the outer segments 46 of the two brackets 36 on the same side of the duct 14 are received in the respective side panel's slits 74, and the two fastener-receiving apertures 76 of each side panel 50 align with the outer apertures 58 of the respective corner panels 52. The fasteners 62 and the apertures 58, 60, and 76 combine to attach the panels of the fireproof barrier 22 to the support frame 18.

The preferred fastener 62 includes a strand of flexible material, such as a single metal or plastic strap with two ends that can loop through the apertures 58, 60, and 76 and around the respective supporting member. More specifically, one end of the strap 62 passes through the side panel aperture 76 and the aligned aperture 58 of the corner panel 52. The strap end then passes around the respective supporting member of the support frame 18 and through the second aperture 60 of the pair defined by the respective corner panel 52. The strap ends are then secured together, such as by twisting the ends together or using a clamp or other lock feature known in the art. Once all the straps 62 (preferably eight for eight panels) are in place, the fireproof barrier 22 is securely fixed to the support frame 18 and the grease absorbing pads 20 may be placed on the support frame 18.

The preferred fireproof barrier 22 is intended to substantially extend about the whole underside of the grease absorbing pads 20, thereby creating a barrier between the pads 20 and the roof 16. This type of barrier provides additional fire protection to satisfy the requirements of the NFPA 96. Further, the preferred fireproof barrier 22 also engages the grease absorbing pads 20 in a manner that supports them vertically and restricts their vertical and lateral movement. This aids in preventing damage to or unintentional removal of the absorbing pads 20, such as by weather.

Figure 15:
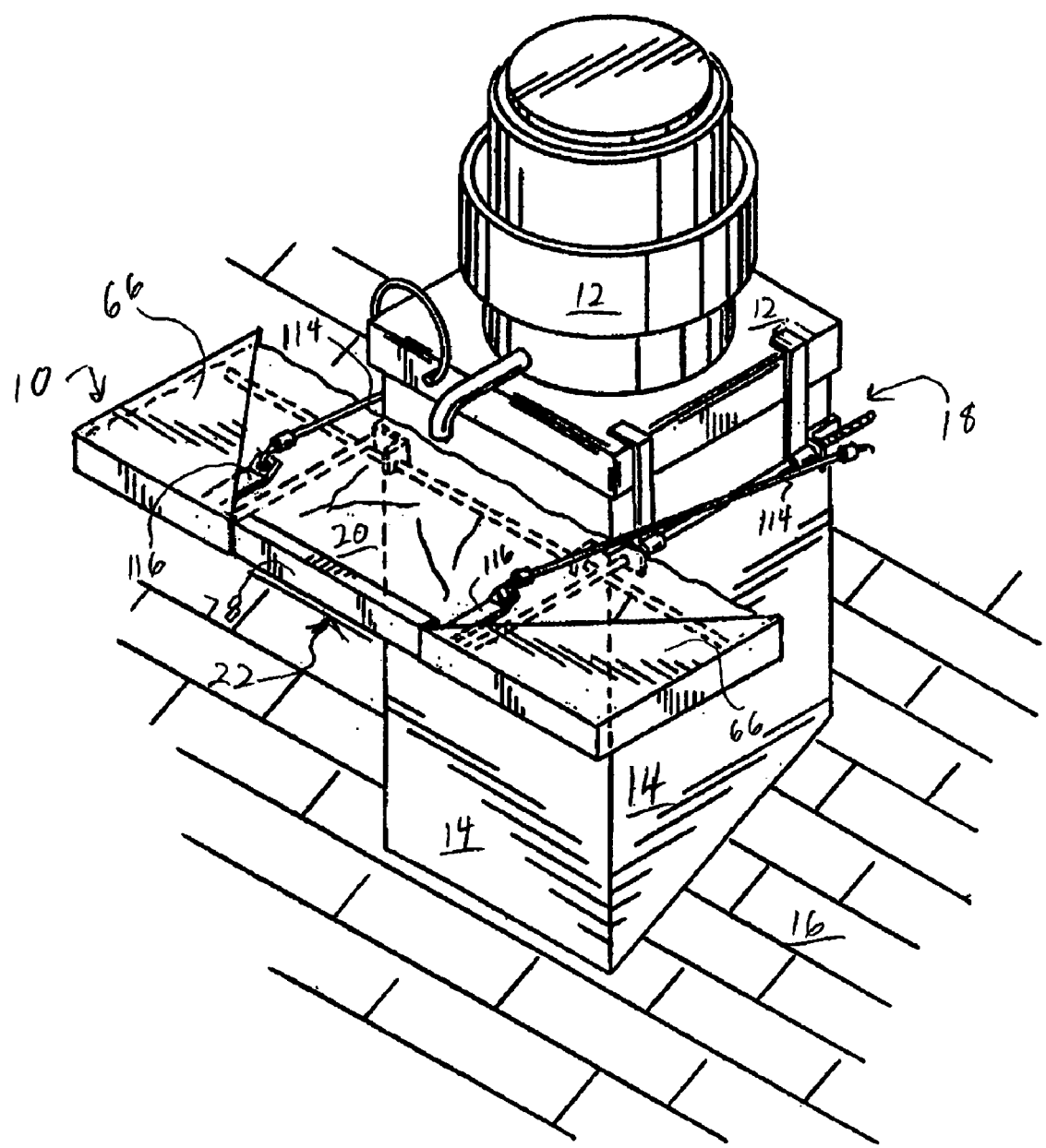
FIG. 15 is a perspective view of an alternate grease filter assembly embodying features of the present invention.

In FIG. 15, there is illustrated another grease filter assembly that combines the fireproof barrier 22 with additional retaining means for maintaining the grease absorbing pads 20 in place. The retainer includes multiple bands 114 attached to clips 116 and the support frame 18. The clips 116 also attach to the support frame 18 and engage the grease absorbing pads 20. It also should be appreciated that the additional retaining means could be employed in a manner that it alone maintains the absorbing pads 20 in place such that the barrier 22 could eliminate the top covers 66 and the flanges 64 and 78 of the corner and side panels 52 and 50, respectively. The generally main portions of the corner and side panels 52 and 50 still provide a barrier between the grease absorbing pads 20 and the roof 16.

Figure 9:
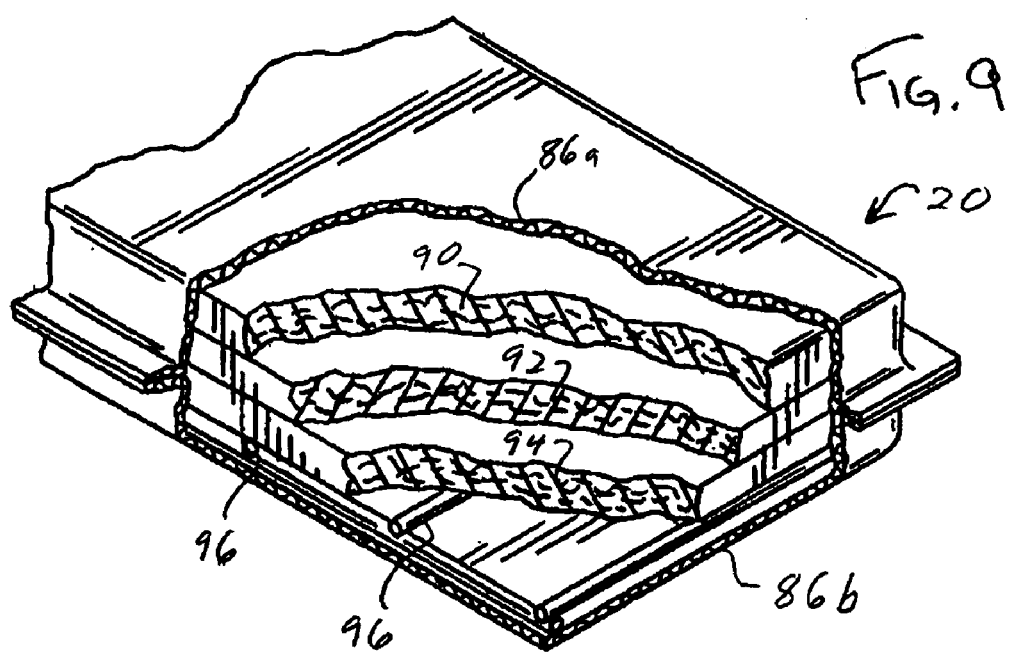
FIG. 9 is a partially cutaway perspective view of a grease absorbing pad used with the grease filter assembly of FIG. 1A.
Figure 10:
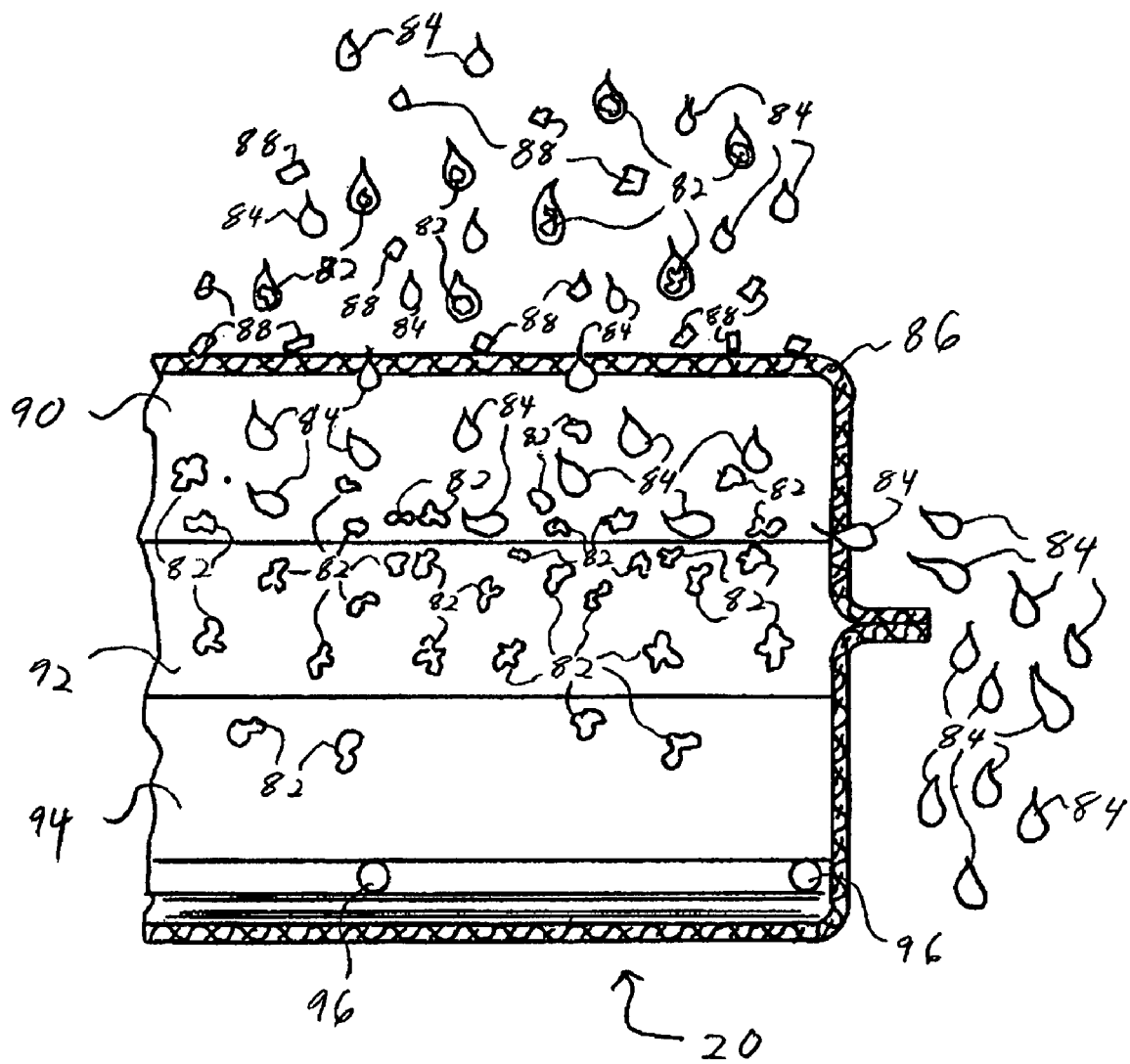
FIG. 10 is a partial cross-sectional elevational view of the grease absorbing pad of FIG. 9.

As illustrated in FIGS. 9 and 10, the preferred grease absorbing pads 20 each include a composite structure designed to absorb grease 82 from a grease 82 and water 84 mixture discharged from the vent 12. Each pad 20 includes an outer layer 86, which is a porous material for filtering out particulate matter 88 that may be present in the grease 82 and water 84 mixture. The outer layer 86 allows the grease 82 and water 84 mixture to pass through to a number of inner layers that absorb the grease 82. The outer layer 86 consists of a top portion 86a and a bottom portion 86b that are sealed along three sides of the pad 20 by heat sealing or other form of sealing to form a pocket in which the other layers of the pad 20 are inserted.

One of the inner layers of the pad 20 is a layer of grease absorbing and water passing material 90. This inner layer 90 is made of material that preferably absorbs a substantial portion of the grease 82 from the grease 82 and water 84 mixture while allowing the water 84 to pass through.

Another inner layer is a water-repellent grease absorbing material 92 disposed directly beneath the layer of grease absorbing and water passing material 90. This second inner layer 92 preferably absorbs substantially all of the grease 82 not absorbed by the layer of grease absorbing and water passing material 90 and prevents substantially all of the water 84 from passing therethrough. The second inner layer 92 is designed to direct the grease 82 and water 84 mixture passing through the pad 20 to flow generally parallel and between the two layers 90 and 92. This flow between the two layers 90 and 92 creates an increased contact time of the grease 82 and water 84 mixture with the layers, thereby allowing them to absorb substantially all of the remaining grease 82 from the grease 82 and water mixture 84.

The pads 20 and their respective layers are made sufficiently large and thick enough so that substantially all of the grease 82 is absorbed in the time it takes for the grease 82 and water 84 mixture to run to the periphery of the pads 20. Accordingly, with the preferred pads 20, only water 84 remains unabsorbed and is allowed to run off the sides of the layer of water-repellent grease absorbing material 92 and fall onto the roof 16. As a result, the potential for deterioration of the roofing material is significantly reduced because virtually no grease 82 remains in the water 84 which falls onto the roof.

A product sold by DuPont Corporation under the tradename "TYWIK" has been found to be well suited for use as the layer of grease absorbing and water passing material 90. A polypropylene product sold by New Pig Corporation of Tipton, Pa. under the tradename "MAT 403" has been found to be well suited for use as the layer of water-repellent grease absorbing material 92.

As a further measure, a layer of plastic-backed grease absorbing material may be installed as a third layer 94 disposed beneath the layer of water-repellent grease absorbing material 92. In the event the layer of water-repellent grease absorbing material 92 is not timely changed and an amount of grease 82 in excess of the predetermined amount of grease 82 that the first two layers 90 and 92 are capable of absorbing be allowed to accumulate, the extra layer of plastic-backed grease absorbing material 94 in contact with the layer of water-repellent grease absorbing material 92 would then absorb the excess grease 82. The plastic backing of the layer of plastic-backed grease absorbing material 94 is also a precautionary measure serving to block water 84 from exiting downwardly through the lower layer. Instead, the third layer 94 also forces the grease 82 and water 84 mixture to flow laterally to extend the contact time with the several layers of the pad 20 to ensure maximum absorption of grease 82. A product sold by New Pig Corporation under the tradename "MAT 285" has been found to be well suited for use as the layer of plastic-backed grease absorbing material 94. However, a wide variety of other suitable materials are readily available for the three layers of the pads 20, and the invention is not limited to the particular materials discussed above.

The several layers of the preferred composite pad 20 stack on top of a wire frame 96 disposed beneath the layer of plastic-backed grease absorbing material 94. The wire frame 96 provides structural rigidity to the pad 20. Given the several layers of material and the size of the pads 20, the wire frame 96 must be formed of wire of a sufficiently large gauge to support the weight of the layers even when the layers are water soaked and there is no support directly beneath the pad 20. The structural rigidity provided by the wire frame 96 also facilitates easy replacement of the grease absorbing pads 20.

Figure 11A:
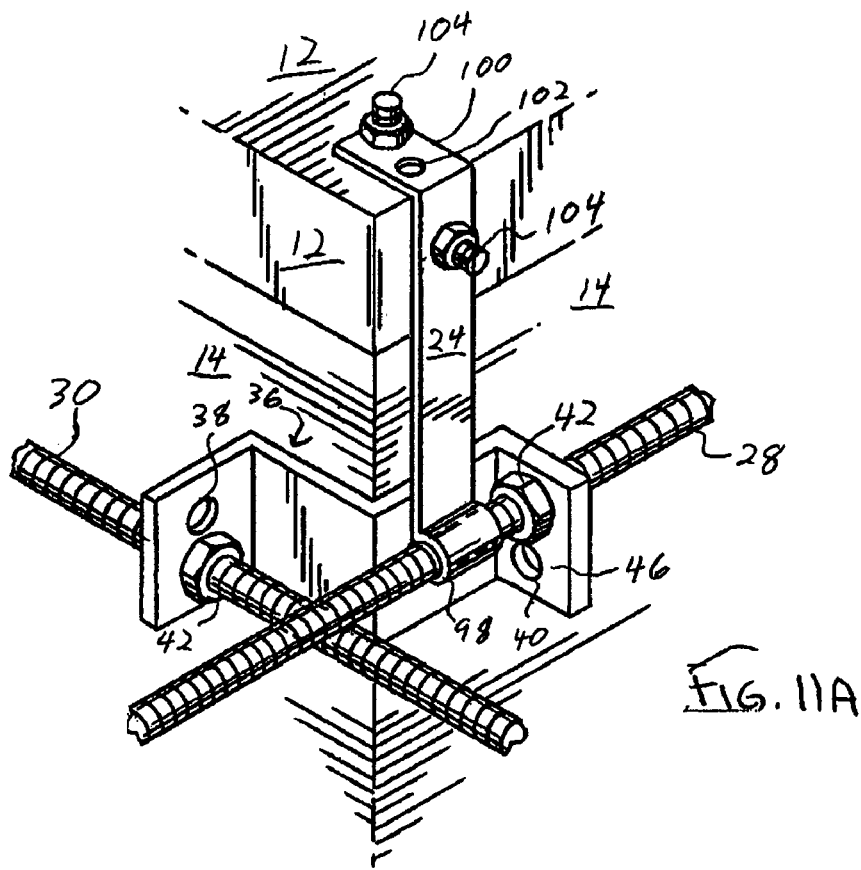
FIG. 11A is a perspective view of a hinge which can be used with the grease filter assembly of FIG. 1A.
Figure 11B:
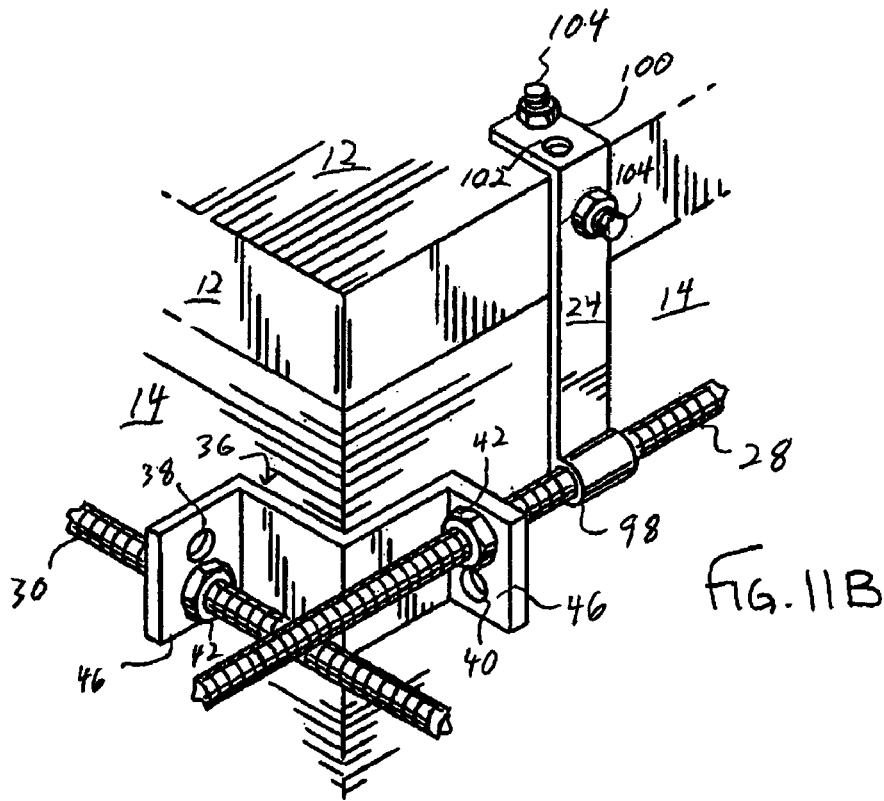
FIG. 11B is a perspective view of a hinge from the grease filter assembly of FIG. 1A.
Figure 12:
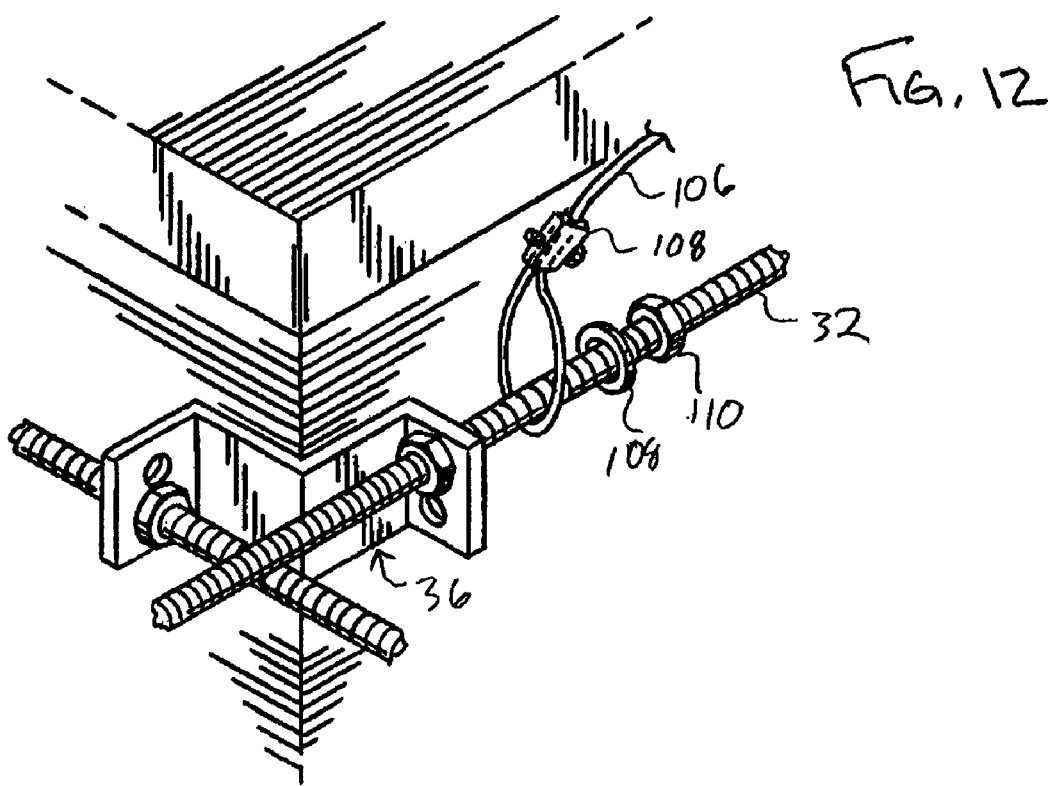
FIG. 12 is a partial perspective view of the hinge stop of the grease filter assembly of FIG. 1A.

As discussed briefly above, a further improvement to previous grease filter assemblies is the ability to selectively open and close the grease discharge vent 12 for easy cleaning as required by NFPA 96. As illustrated in FIGS. 11A, 11B, and 12, the hinges 24 each include a sleeve 98 through which one of the support members, such as member 28, of the support frame 18 extends. An L-shaped mounting bracket 100 extending the hinge 24 is used to attach to the grease discharge vent 12. The hinges 24 are preferably installed by sliding the support member (e.g. rod 28) from the support frame 18 through the sleeve 98 when the support frame 18 is constructed. Preferably, one of the two support members 28 or 32 placed through the upper apertures 38 of the mounting brackets 36 is used with the hinges 24. The upper supporting member 28 facilitates easier movement of the vent 12 although the hinges 24 may be mounted to any supporting member. Further, the hinges 24 may be placed anywhere along the length of the supporting member within the span of the duct 12. For example, in FIG. 11A, the hinge 24 is located outside of the outer planar segment 46 of the mounting bracket 36, whereas, in FIG. 11B, the hinge 24 is located inside of the outer planar segment 46 of the mounting bracket 36.

The L-shaped mounting bracket 100 of each hinge 24 also defines a number of apertures 102 through which fasteners 104 can be inserted to fasten the hinge 24 to the grease discharge vent 12. The mounting bracket 100 is preferably bolted to both the side and top of the vent 12. The hinge alternatively can be securely fastened to the vent 12 in other suitable ways, including welding or clamping. With the hinge 24 properly installed, the grease discharge vent 12 may be opened by lifting the vent 12 such that the hinge 24 with the vent 12 pivots around the attached support member (e.g. rod 28). When opened, the vent 12 is supported by the support frame 18.

Figure 13:
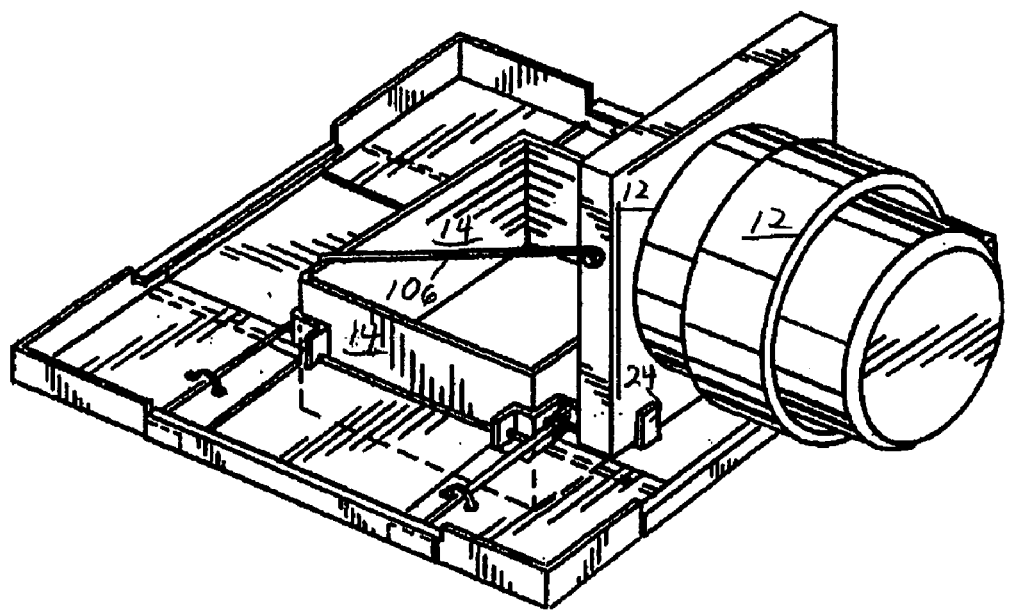
FIG. 13 is a perspective view of the grease filter assembly of FIG. 1A with the top corner cover and the grease absorbing pads removed and illustrating the vent hinged open and restricted by the hinge stop.

As illustrated in FIGS. 12 and 13, the hinge stop 26 limits the distance that the grease discharge vent 12 can be opened with the hinge 24. The stop 26 can be any device that prevents the vent 12 from opening past a certain point. The preferred stop 26 includes at least one semi-flexible member 106 with a first end fixedly attached to the grease discharge vent 12 and a second end fixedly attached to the support frame 18. The flexible member 106 is preferably a metal wire, but other suitable structures can be used such as rope or chain.

The first end of the wire 106 is preferably bolted to the grease discharge vent 12 although it may be attached by any suitable device, such as a clamp, weld, adhesive, etc. The second end of the wire 106 is also fixedly attached to the support frame 18 by any suitable means. The second end preferably is attached to the support frame 18 by wrapping the wire 106 around one of the supporting members (e.g. rod 32) of the support frame 18 on the side of the duct 14 opposite of the hinges 24. One or more clamps 108 secure the wire 106 to itself forming a closed loop around the supporting member and inside of the outer planar segment 46 of the mounting bracket 36. The closed loop of the wire 106 is then preferably secured against the mounting bracket 36 for further stability. A washer 110 and a nut 112 threadably engaged along the corresponding support member are used to secure the loop against the mounting bracket 36. As illustrated in FIG. 13, the length of the wire 106 may be adjusted such that the vent 12, when open, is securely balanced in a position allowing for easy cleaning. Further, more than one wire 106 may be used to provide better balancing of the vent 12. It is preferred that the grease absorbing pads 20 are removed prior to opening the vent 12 to allow free movement of the hinges 24. To replace the pads 20, first the top covers 66 are removed from the corner panels 52. Then the old pads 20 are lifted off the support 18 and replaced by the new pads 20.

Figure 14:
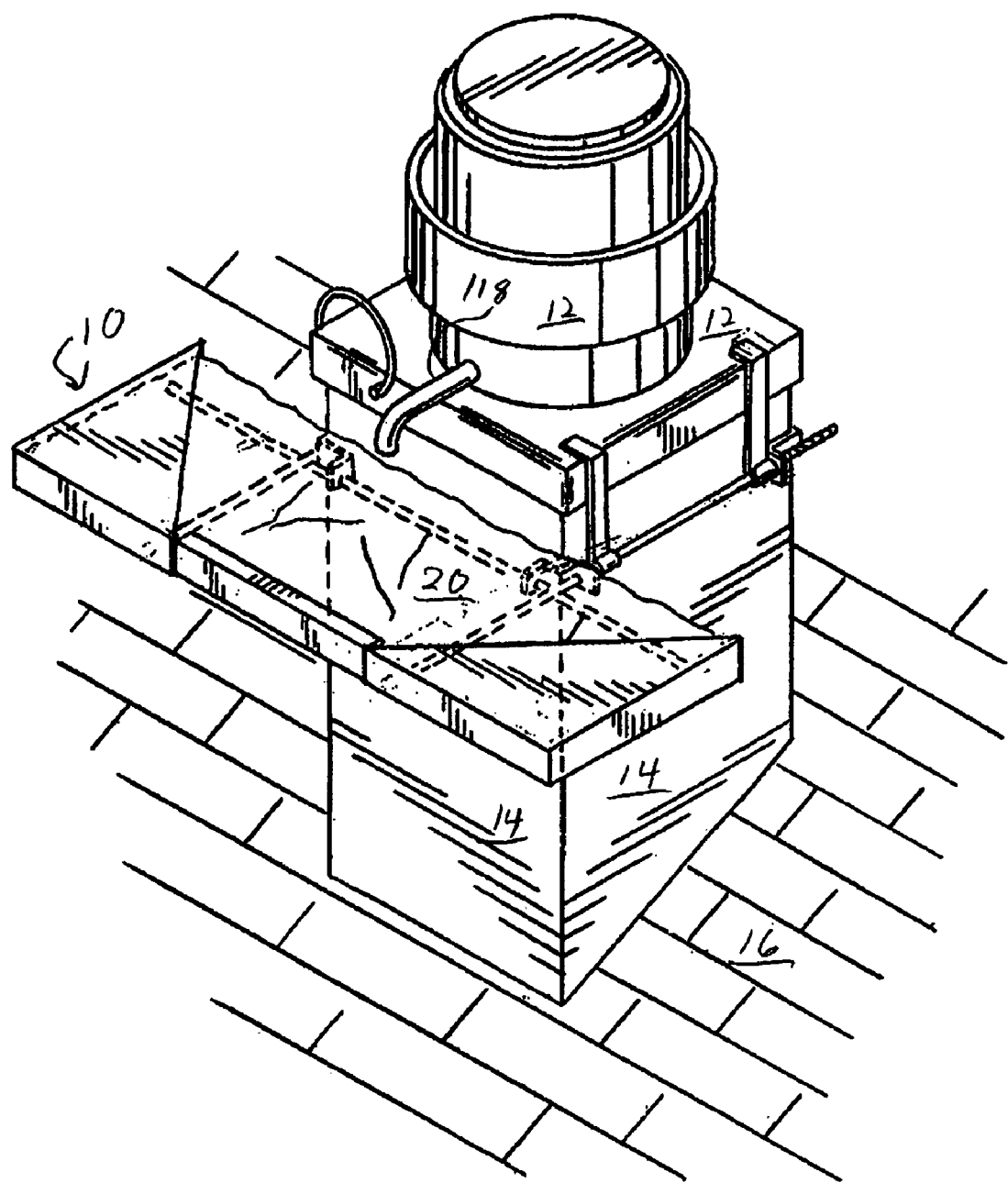
FIG. 14 is a perspective view of an alternate grease filter assembly embodying features of the present invention.

The invention in its various embodiments can be used with various roof, vent, and duct types. As illustrated in FIG. 2, the support frame 18 can be placed on a duct 14 extending from a pitched roof 16 because it is mounted directly to the duct 14, independent of the roof 16. Alternatively, as illustrated in FIG. 14, the grease filter assembly 10 can be adapted for use with a grease discharge vent 12 having an opening, spout, or drain 118 through which grease is discharged. In this embodiment, the grease absorbing pad 20 needs only to be placed below the spout or drain 118 instead of around the whole vent 14.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the present invention.

I claim:

1. A filter assembly for absorbing grease or similarly viscous substances discharged from a vent connected to a duct, the assembly comprising:
   a support attachable to and having a portion extending outwardly from a duct of a vent;
   at least one grease absorbing pad supported by the support;
   at least one hinge mounted to a vent and mounted pivotally about at least a portion of the support such that the vent can be selectively opened and closed;
   a fireproof barrier at the support adjacent the at least one grease absorbing pad; and
   at least one retainer engageable with the at least one grease absorbing pad to resist movement of the at least one grease absorbing pad relative to the support.

2. The filter assembly of claim 1 wherein the support further comprises:
   a plurality of support members for being positioned generally at adjacent sides of a duct of a vent;
   a plurality of mounting brackets, each bracket defining at least one aperture for receiving therethrough one of the support members; and
   at least one first fastener mounting each bracket to at least two support members for clamping the support to a duct of a vent.

3. The filter assembly of claim 2 wherein the plurality of support members further comprises a plurality of rods.

4. The filter assembly of claim 3 wherein each of the plurality of threaded rods includes a threaded portion.

5. The filter assembly of claim 1 wherein the at least one grease absorbing pad further comprises:
   a layer of grease absorbing and water passing material to absorb a substantial portion of grease of a grease and water mixture and allowing substantially all of the water of the grease and water mixture to pass therethrough; and
   a layer of water-repellent grease absorbing material disposed beneath the layer of grease absorbing and water passing material to absorb substantially all of the grease not absorbed by the layer of grease absorbing and water passing material and to prevent substantially all of the water from passing therethrough.

6. The filter assembly of claim 5 wherein the at least one grease absorbing pad further comprises a layer of porous material disposed above the layer of grease absorbing and water passing material for filtering out particulate.

7. The filter assembly of claim 6 wherein the grease absorbing pad further comprises a wire frame disposed beneath the layer of water-repellent grease absorbing material for providing structural rigidity to the at least one grease absorbing pad.

8. The filter assembly of claim 1 wherein the fireproof barrier further comprises at least one layer of a fireproof material.

9. The filter assembly of claim 8 wherein the at least one layer includes at least one panel.

10. The filter assembly of claim 9 wherein at least one of the panels includes a flange to restrict movement of the at least one grease absorbing pad.

11. The filter assembly of claim 10 wherein the flange includes a lip to restrict movement of the at least one grease absorbing pad.

12. The filter assembly of claim 9 wherein the at least one panel includes at least one corner panel substantially covering an area of the at least one grease absorbing pad extending away from a corner of a duct.

13. The filter assembly of claim 12 wherein the at least one panel includes at least one side panel substantially covering an area of the at least one grease absorbing pad along a side of a duct.

14. The filter assembly of claim 13 further comprising a top cover attached to the at least one corner panel to restrict movement of the at least one grease absorbing pad relative to the support.

15. The filter assembly of claim 1 wherein the fireproof barrier includes the at least one retainer.

16. The filter assembly of claim 1 wherein the at least one hinge further comprises a sleeve for pivotally mounting the at least one hinge to the portion of the support.

17. The filter assembly of claim 1 further comprising at least one hinge stop limiting a distance that the grease discharge vent can be opened.

18. A filter assembly for absorbing grease or similarly viscous discharge from a vent connected to a duct, the assembly comprising:
   a support attachable to and having a portion extending outwardly from a duct of a vent;
   at least one grease absorbing pad supported by the support;
   at least one hinge mounted to a vent and pivotally mounted about at least a portion of the support such that the vent can be selectively opened and closed;
   at least one hinge stop limiting a distance that the vent can be opened; and
   at least one retainer engageable with the at least one grease absorbing pad to resist movement of the at least one grease absorbing pad relative to the support.

19. The filter assembly of claim 18 wherein the support further comprises:
   a plurality of support members for being positioned generally at adjacent sides of a duct of a vent;

a plurality of mounting brackets each defining at least one aperture for receiving therethrough one of the support members; and at least one first fastener mounting each bracket to at least two support members for clamping the support to a duct of a vent.

20. The filter assembly of claim 19 wherein the at least one hinge further comprises a sleeve for receiving one of the support members.

21. The filter assembly of claim 18 wherein the at least one hinge defines at least one fastening aperture for receiving a second fastener to fasten the hinge to a side of a vent.

22. The filter assembly of claim 18 wherein the at least one hinge stop further comprises at least one semi-flexible member having a first end attached to a vent and a second end attached to the support.

* * * * *